UNITED STATES PATENT OFFICE.

KARL SCHIRMACHER AND ARNOLD BRUNNER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

RED VAT-DYE.

No. 881,159.  Specification of Letters Patent.  Patented March 10, 1908.

Application filed February 20, 1907. Serial No. 358,421.

*To all whom it may concern:*

Be it known that we, KARL SCHIRMACHER, Ph. D. and ARNOLD BRUNNER, Ph. D., chemists, citizens of the Empire of Germany, and residing at Höchst-on-the-Main, Germany, have invented certain new and useful Improvements in Making New Red Vat-Dyestuffs, of which the following is a specification.

We have found a new red vat dyestuff distinguished by its beauty and fastness of its tints. The constitution of same corresponds to the formula

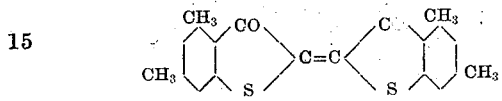

The dyestuff is a red powder insoluble in water, difficultly soluble in hot alcohol, more easily soluble in hot glacial acetic acid, benzene and chloroform with a yellow-red color, soluble in concentrated sulfuric acid with a green color. With alkaline hydrosulfite it yields a yellowish solution from which wool and cotton are dyed fast tints similar to alizarin pink.

This dyestuff may be obtained, for instance, as follows:—

Example I: 16.5 parts by weight of ortho-nitro-meta-xylidin $$(CH_3:CH_3:NO_2:NH_2 = 6:4:2:1)$$

are diazotized with 6.9 parts by weight of nitrite and 40 parts by weight of hydrochloric acid of 20° Bé. specific gravity and the filtered diazo solution is introduced at gentle heat into a solution of copper-cyanid resulting from 25 parts by weight of copper sulfate and 28 parts by weight of potassium cyanid. The nitrite is separated while nitrogen is evolved. After boiling then for a short time it is allowed to cool and the residue of filtration is dissolved in hot alcohol. When cold or on adding water the nitro-meta-xylonitril $(CH_3:CH_3:NO_2:CN = 6:4:2:1)$ is separated. It is somewhat volatile with steam and readily soluble in hot alcohol and in much boiling water; it crystallizes from both diluents in form of yellow colored needles.

To transform the nitrite into the acid, 17 parts by weight of the afore described nitrite are allowed to digest at 100° C. with 100 parts by weight of sulfuric acid of 90% strength, till a complete solution is effected. There are then added about 350 parts by weight of water and a concentrated solution of 13 parts by weight of nitrite is gradually introduced in the heat, while stirring, below the surface of the liquid. When all is run in, heating is continued for another ½ hour; the solution is then allowed to cool and the separated nitroxylic acid $(CH_3:CH_3:NO_2:COOH = 6:4:2:1)$ is filtered. In a pure state the acid is nearly colorless, readily soluble in alcohol from which it is precipitated on addition of water. It dissolves in hot water from which it crystallizes when cold in small yellowish crystals. It melts at about 189° C.

To reduce the nitro-xylic acid 20 parts by weight of this compound are dissolved in 5.6 parts by weight of sodium carbonate to which are added 11 parts by weight of sodium di-sulfid and the whole is boiled for some hours. It is then acidified with acetic acid and much evaporated. The residue is treated with concentrated hydrochloric acid in the cold until acid reaction and then filtered. The solution contains the o-amino-xylic acid 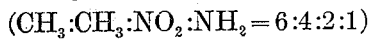
The diazo compound obtained from this acid by adding 25 parts by weight of hydrochloric acid and 6.9 parts by weight nitrite is introduced into a solution of 18 parts by weight of potassium xanthogenate and 40 parts by weight of sodium carbonate. After stirring several hours, 15 parts by weight of sodium chloracetate and 25 parts by weight of caustic soda-lye 40° Bé. are added and the whole is heated to 100 C. for several hours. When cold it is acidified with mineral acids, whereupon the 2.4-xylylthioglycollic-ortho-carboxylic acid

is precipitated. It is soluble with difficulty in cold water.

To manufacture the dimethyl-oxythionaphthene carboxylic acid 20 parts by weight of the xylylthioglycollic-ortho-carboxylic acid are heated to 180–190° C. for some time with a mixture of 120 parts by weight of caustic soda and 12 parts by weight of water. The mass assumes gradually a yellowish tint. When cold it is dissolved in water and then a solution of potassium ferri cyanid is added until no more of the dyestuff separating in red flakes is formed.

The dyestuff is filtered and washed with water. When dry it is a red powder, soluble in alkaline hydrosulfite with formation of a yellow colored vat. From this vat wool and cotton are dyed similar to the shade of alizarin-pink. This dyestuff compared with thioindigo is particularly distinguished by its excellent fastness to washing.

Having now described our invention, what we claim is:—

As product the red vat dyestuff which corresponds to the constitutional formula

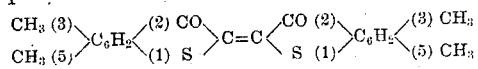

being a red powder insoluble in water, very difficultly soluble in hot alcohol, more easily soluble in hot benzene, glacial acetic acid and chloroform with a red color; soluble in concentrated sulfuric acid with a green color, forming with alkaline hydrosulfite a yellow vat from which wool and cotton are dyed fast tints to alizarin-pink.

In testimony, that we claim the foregoing as our invention, we have signed our names in presence of two subscribing witnesses.

KARL SCHIRMACHER.
ARNOLD BRUNNER.

Witnesses:
JEAN GRUND,
CARL GRUND.